United States Patent
Clare et al.

[11] Patent Number: 5,823,598
[45] Date of Patent: Oct. 20, 1998

[54] HIDDEN STORAGE FOR VEHICLES

[76] Inventors: Scott Clare, 3381 Shawn Ct.; Neil G. Long, 2630 Randall Way, both of Hayward, Calif. 94541

[21] Appl. No.: 910,516

[22] Filed: Aug. 2, 1997

Related U.S. Application Data

[63] Continuation-in-part of Ser. No. 685,678, Jul. 24, 1996, abandoned, which is a continuation-in-part of Ser. No. 506,893, Jul. 26, 1995, Pat. No. 5,567,000.

[51] Int. Cl.$^6$ ..................................................... B60R 11/06
[52] U.S. Cl. ......................... 296/37.6; 296/24.1; 92/144; 188/322.12
[58] Field of Search ................................. 296/24.1, 37.1, 296/37.6, 181, 183; 224/402, 403, 404; 188/322.12; 92/144

[56] References Cited

U.S. PATENT DOCUMENTS

| | | | |
|---|---|---|---|
| 1,490,657 | 4/1924 | Botella | 296/37.1 |
| 1,990,757 | 2/1935 | Stiles | 296/37.1 |
| 2,455,417 | 12/1948 | Holan et al. | 296/37.6 X |
| 2,722,352 | 11/1955 | Dehnel | 296/24.1 X |
| 2,978,153 | 4/1961 | Brindle | 296/37.6 X |
| 3,245,713 | 4/1966 | Ogilvie | 296/37.6 X |
| 3,326,595 | 6/1967 | Ogilvie | 296/37.6 |
| 3,727,971 | 4/1973 | Sisler | 296/37.6 |
| 4,685,695 | 8/1987 | LeVee | 296/37.6 X |
| 4,705,317 | 11/1987 | Henri | 296/37.6 |
| 4,789,195 | 12/1988 | Fletcher | 296/37.6 |
| 5,303,969 | 4/1994 | Simnacher | 296/37.6 |
| 5,567,000 | 10/1996 | Clare | 296/37.6 |

*Primary Examiner*—Andrew C. Pike
*Attorney, Agent, or Firm*—L. E. Carnahan

[57] ABSTRACT

A hidden storage is for vehicles such as vans and utility/sports utility vehicles without altering the external appearance of the vehicle. The hidden storage is located adjacent one or both sides of the vehicle between a rearmost side door and the rear of the vehicle. The hidden storage is accessible only via one or more hinged contoured side panel sections of the vehicle and which include at least one peripheral edge, and access to the interior of the vehicle does not provide access to the hidden storage area. The hidden storage is provided by a storage box secured to the side of the vehicle and the interior of the storage box is only accessible through opening of an associated hinged section of the side panel of the vehicle, which can be locked shut.

48 Claims, 11 Drawing Sheets

HIDDEN STORAGE FOR VEHICLES

RELATED APPLICATION

This application is a Continuation-In-Part of U.S. application Ser. No. 08/685,678 filed Jul. 24, 1996, now abandoned which is a Continuation-In-Part of U.S. application Ser. No. 08/506,893 filed Jul. 26, 1995, now U.S. Pat. No. 5,567,000 issued Oct. 22, 1996.

BACKGROUND OF THE INVENTION

The present invention relates to storage systems for vehicles, particularly to hidden storage for vehicles having side panels, while maintaining the external appearance thereof, and more particularly to hidden storage for vans, utility, and sports utility vehicles without substantially altering the external appearance of the vehicle.

Various types of storage/utility systems have been utilized in various types of vehicles, primarily pickups, trucks, and trailers for transporting and/or storing tools, materials, etc. Recently a hidden storage/utility system has been developed wherein the external appearance of the vehicle has not been changed, and the carrying capacity has not been significantly reduced. This hidden storage/utility system is described and claimed in above-referenced U.S. Pat. No. 5,567,000. Also, copending application Ser. No. 08/896,392, filed Jul. 18, 1997 entitled Hidden Storage/Utility System and Fabrication Thereof, describes and claims modifications of the hidden storage arrangement of U.S. Pat. No. 5,567,000. Fabrication of the hidden storage/utility system may be carried out, for example, as described and claimed in above-referenced copending application Ser. No. 08/685,678.

The hidden storage/utility system basically involved providing storage adjacent the wheel well area along part or the entire length of the bed, and providing, for example, the fender/side panel of the bed with a hinge and lock/latch arrangement, whereby the fender/side panel can be raised to expose the storage area, or closed and latched to conceal the storage area. In the closed position the external appearance is substantially the same as an identical vehicle without the hidden storage capability. Thus, by use of the hidden storage/utility system, the vehicle can be parked in areas where theft would likely occur from conventional storage/utility systems.

Like pickups, trucks, and trailers, there is small to no hidden storage in vans, utility vehicles, and sports utility vehicles. Any hidden storage in such vehicles is in the interior thereof and access to the interior provides access to the hidden storage areas. Thus, theft from such vehicles is carried out by merely obtaining access to the interior thereof. To prevent potential theft, valuables must be removed from the vehicle and/or expensive alarm systems must be added. Thus, there has been a need for safe, readily accessible hidden storage in vans and utility/sports vehicles.

This need for hidden storage for such vehicles has been resolved by the present invention which involves an extension of the hidden storage/utility system of the above-referenced patent by applying the principles of that hidden storage system to vans, utility vehicles, and sports utility vehicles, wherein side panel sections of the vehicle are hinged and provided with storage areas thereunder which are accessible upon raising (or lowering) the hinged side panel sections. In addition to the interior of the van, utility and/or sports utility vehicles, which provide storage but the storage is readily accessible to theft, the present invention provides hidden storage (a trunk) for such vehicles with minimum altering of the external appearance of the side panels of the vehicle, and which is readily accessible to the owner but not readily accessible to theft. The hidden storage system of this invention can be fabricated via a conversion method, a modular assembly method, or an assembly line method.

SUMMARY OF THE INVENTION

It is the object of the invention to provide hidden storage for vehicles without noticeable alteration of the external appearance of the vehicles.

A further object of the invention is to provide hidden storage for vans, utility vehicles, and sports utility vehicles.

A further object of the invention is to provide for fabrication of a hidden storage system in a vehicle by conversion, modular assembly, or via an assembly line.

A further object of the invention is to provide hidden storage for vehicles utilizing hinged and latched sections of the fender/side panels of the vehicles.

Another object of the invention is to provide a van, utility vehicle, or sports utility vehicle with safe, readily accessible hidden storage that is not accessible by mere access to the interior of the van or utility/sports vehicle.

Another object of the invention is to provide a vehicle with a hidden storage area along at least one side of the vehicle, that is accessible only by raising (or lowering) at least one hinged section of a side panel of the vehicle, without altering the normal external appearance of the vehicle.

Another object of the invention is to provide hidden storage for a van, utility, or sports utility vehicle which may, for example, extend along the entire length or partial length of the vehicle from a door to the rear of the vehicle, and which is accessible only via one or more hinged and latched sections of the side panel or fender/side panel of the vehicle, with only minor modification of the external appearance of the vehicle.

Other objects and advantages of the present invention will become apparent from the following description and accompanying drawings. Basically, the invention involves providing hidden storage for vehicles, particularly for vans, utility, and sports utility vehicles, with only minor alteration of the normal external appearance of the vehicle. The minor alteration of the normal external appearance involves only thin vertical and/or horizontal lines in the side panels which define the edge or edges of the hinged side panel sections, the hinges for the side panel sections being hidden with a latch/lock arrangement being hidden and accessible from the rear interior of the vehicle or by electrical control from a key or keyless control in the vehicle. Due to the width of a normal vehicle side panel, which consists of an outer and an inner panel, removal of the inner panel, hinging of the outer panel, and positioning of a narrow storage box having its only opening adjacent the removed inner panel provides adequate storage space for long items such as snow or water skis, ski poles, surfboard, rifles, etc., as well as for storage of camping/sports equipment or for materials or tools utilized in various trades. The narrow storage box, which may be as wide as the wheel wells of the vehicle, or narrower, results in only a small loss of interior space along the interior of one or both sides of the vehicle. By way of example, using a conventional van having only a driver door on the left side of the van, the hidden storage could extend from adjacent the driver's door to the rear of the van, the storage box being configured, for example, to conform to the floor and any wheel well area of the van. With the storage box welded or otherwise secured to the side of the van, the only access to the interior of the storage box is via one or more hinged portions of the outer panel section of the side panel or fender/side panel, depending on the external configuration of the vehicle. By use of hidden hinges and hidden latch mechanisms which are commercially available and capable of withstanding 1,500 pounds pry pressure and controlled by conventionally available lock systems, the only changes in the exterior appearance of the side panel of the vehicle are the narrow lines along the vertical and/or horizontal edges of the hinged side panel section. The hinged side panel sections are provided on the interior surfaces with sufficient support members and with insulation/sound absorbing materials. The opening or openings in the side panels are provided with seals similar to car trunk lid seals, such that when the hinged side panel sections are closed, water/dust cannot enter the hidden storage area.

The hidden storage arrangement provided by this invention enables numerous types of vehicles to be built or modified to include one or more hidden storage compartments which are accessible only via one or more hinged side panel sections of the vehicle, and with the hinged side panel(s) closed, the storage compartments are not easily identified because of the minor modification in the exterior surface of the vehicle. The hidden storage can be incorporated into a vehicle by conventional assembly line techniques, modular fabrication and assembly, or conversion or retrofitting an existing vehicle.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
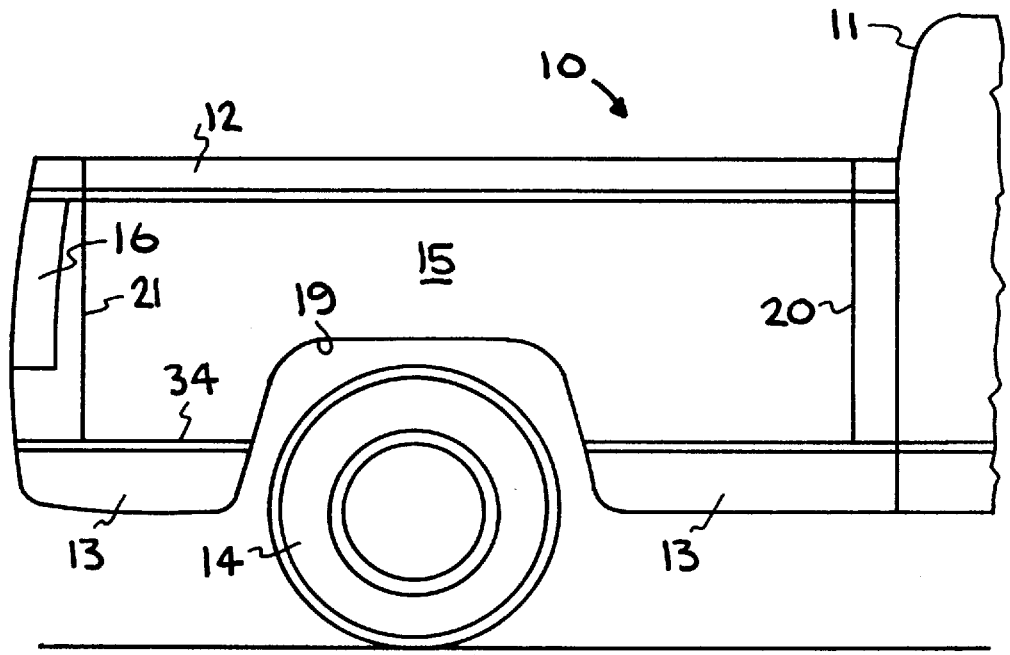
FIGS. 1–4 illustrate an embodiment of a storage system in a bed of a pickup truck in accordance with above-referenced U.S. Pat. No. 5,567,000.

The present invention is directed to hidden storage for vehicles, such as vans and utility/sports utility vehicles, without substantially altering the external appearance of the vehicle. The hidden storage for vehicles as provided by the present invention basically involves providing the vehicle with one or more storage boxes located adjacent one or more side panels of the vehicle, hinging at least one section of the one or more side panels, whereby the hinged section can be opened to expose the interior of the storage box, and providing latch/lock mechanisms for the hinged side panel sections. The only alterations of the external appearance of the vehicle are the narrow vertical and/or horizontal cuts defining the edges of the hinged side panel sections, the hinges and latch mechanisms being hidden.

Vans, both passenger and commercial, as well as utility vehicles and sports utility vehicles, are widely utilized in various fields of work, play, and vacations. A common problem, as pointed out above, with vans and utility/sports utility vehicles is a lack of hidden storage space. Once access to the interior of such a vehicle is made, one also has access to any hidden storage areas therein.

In recent years utility vehicles, such as the Suburban made by General Motors Corporation, sports utility vehicles such as the Bronco or Explorer made by Ford Motor Company, and vans (both mini and full size) such as the Caravan made by Chrysler Corporation, have been popular vehicles for both work and personal use. Hereafter the term vehicle is intended to include all such vehicles. Many of these vehicles are equipped with four-wheel drive and thus are widely used for camping and ski outings. However, a drawback of these vehicles is a lack of storage space, particularly, for example, when families of four to six people travel. As a result on ski outings, for example, the skis, ski poles, etc. are mounted on the top of the vehicle and are thus exposed to the environment and theft. If, for example, skis, etc. are to remain with the vehicle overnight, safety and security requires that the skis, etc. be removed from the top of the vehicle and placed inside the vehicle. Mere breakage of a window in a vehicle, for example, enables access to the interior thereof and theft of the skis or other equipment in the vehicle.

By incorporation of the present invention into such vehicles, skis, ski poles, etc., or water skis, surfboards, etc., for example, may be safely stored in the vehicle, and thus one gaining access to the interior of the vehicle does not have access to the storage area. Access to the storage area is only through a hinged/locked side panel section of the vehicle. Most vehicles of the type considered herein have sufficient length between a door and the rear of the vehicle to enable incorporation of the hidden storage area without adversely affecting the interior space of the vehicle. Thus, while the hidden storage/utility system of the above-referenced U.S. Pat. No. 5,567,000 provides a "truck-with-a-trunk", the present invention provides vans and utility/sports utility vehicles with a trunk, a hidden storage area, with only minor alterations to the external appearance thereof. The hidden storage also serves to provide means to remove unrestrained articles from inside the vehicle, thereby improving passenger safety.

The hidden storage system of the present invention may be fabricated from various materials including metals, fiberglass, reinforced plastics, and combinations thereof, as these various materials are now commonly utilized for various components in vehicle manufacturing.

The hidden storage may be incorporated by various methods, such as by an assembly line method or a conversion (retrofit) method similar to the techniques described and claimed in above-referenced copending application Ser. No. 08/685,678. Also, the components for the hidden storage system may be fabricated and/or assembled using a modular method similar to the technique described and claimed in copending U.S. application Ser. No. 08/896,388, filed Jul. 18, 1997, entitled "Hidden Storage/Utility System Modular Fabrication Method".

While the invention is illustrated and described hereinafter for a van or utility vehicle, it can be incorporated into most vehicles of the type described above, it being recognized that vehicles having two doors on each side rather than a single door leaves less length between the rear door and the rear of the vehicle, and thus less space for hidden storage. Also, vehicles designed for the carrying of passengers, which include windows along the side, provide less space for incorporation of the hidden storage system than similar vehicles not designed for passenger use.

In view of the extension of the hidden storage/utility system of above-referenced U.S. Pat. No. 5,567,000 to vans and utility/sports utility vehicles, again referred to hereinafter generically as vehicles, FIGS. 1–4 illustrate the hidden storage/utility system in a bed of a pickup truck. As seen in FIG. 1, from a side view, the only alterations to the normal exterior side panel appearance are the two vertical lines or cuts indicating the front and rear edges of the hinged side panel. In a later configuration, only one cut under the taillight is visible. The hinge for each side panel is located on an inner area of the side panel so as not to be exposed to one viewing the bed from an external side position. Thus, one would not readily recognize the modification of the bed, and therefore those with intent to steal tools, etc. from the vehicle would not recognize the hidden storage arrangement.

Figure 2:
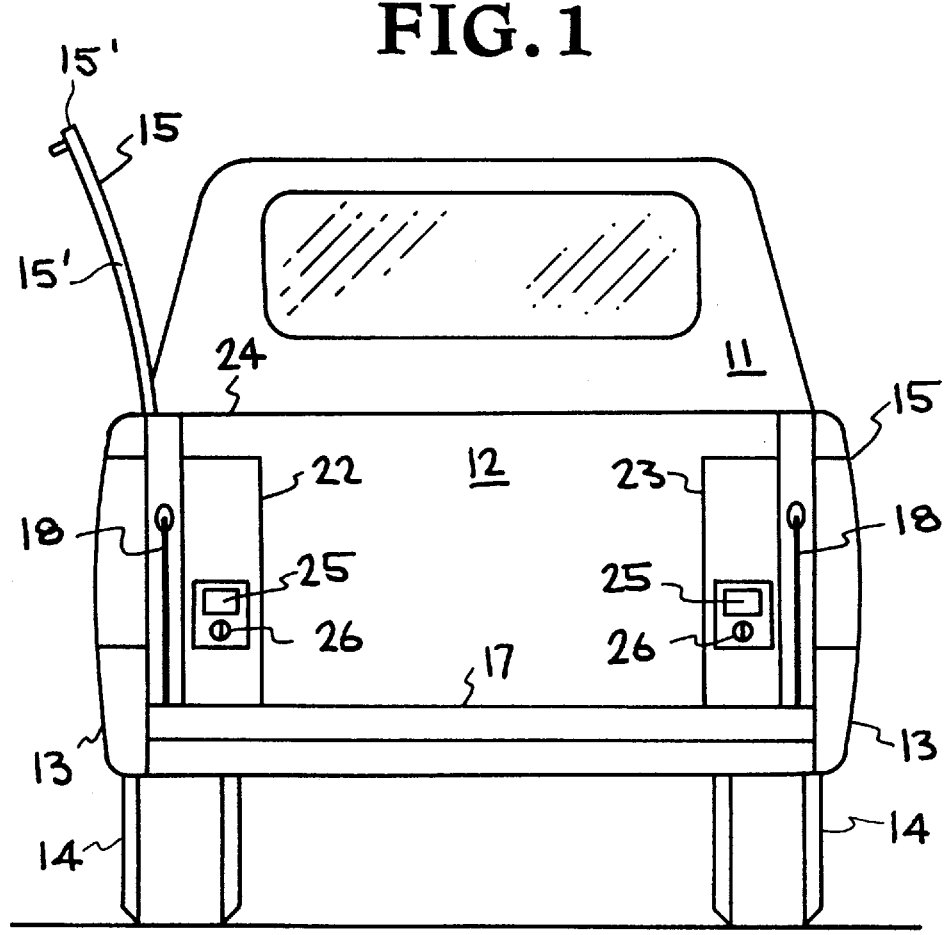

Referring now to the drawings, FIGS. 1 and 2 illustrate a conventionally appearing pickup truck generally indicated at 10 having a cab 11, bed 12, frame or undercarriage 13, wheels 14, and includes side panels 15 each having peripheral edges 15', a taillight arrangement 16, a hinged tailgate 17 with stop mechanisms 18, and wheel wells 19. However, the bed 12 of FIGS. 1 and 2 has been modified in accordance with the present invention, with the only indication of such modification being the cuts, small spaces, or lines 20 and 21 in the side panels 15, as shown in FIG. 1, with the side panel being closed. Note that in this embodiment the side panels 15 terminate adjacent the frame or undercarriage 13.

Figure 3:
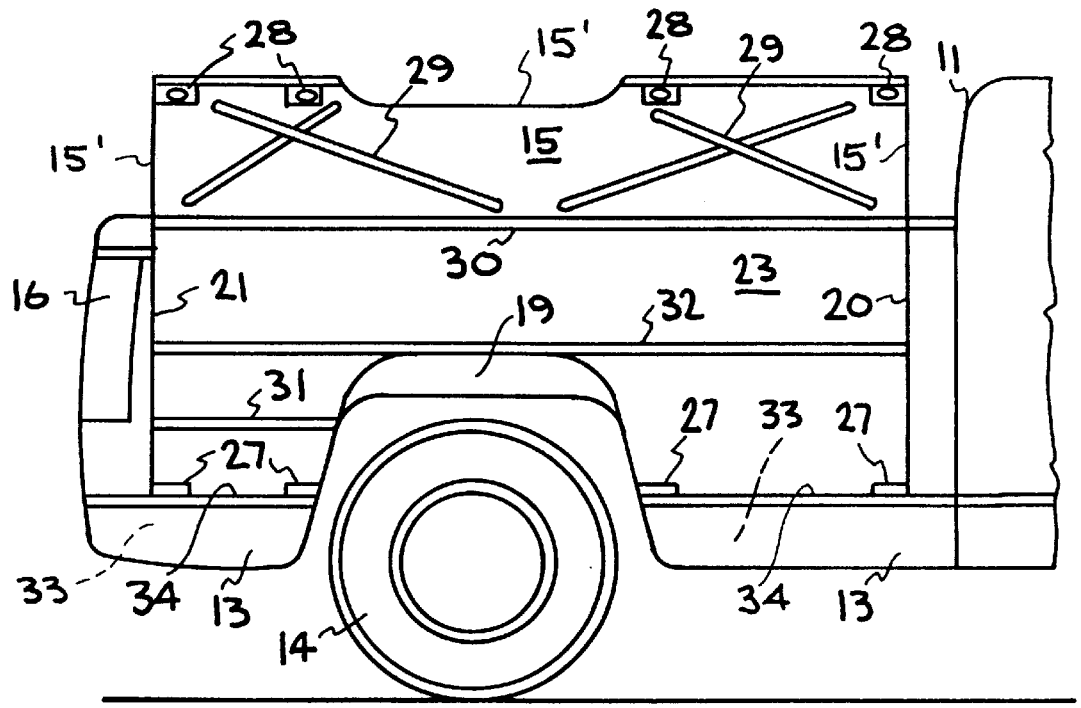
Figure 4:
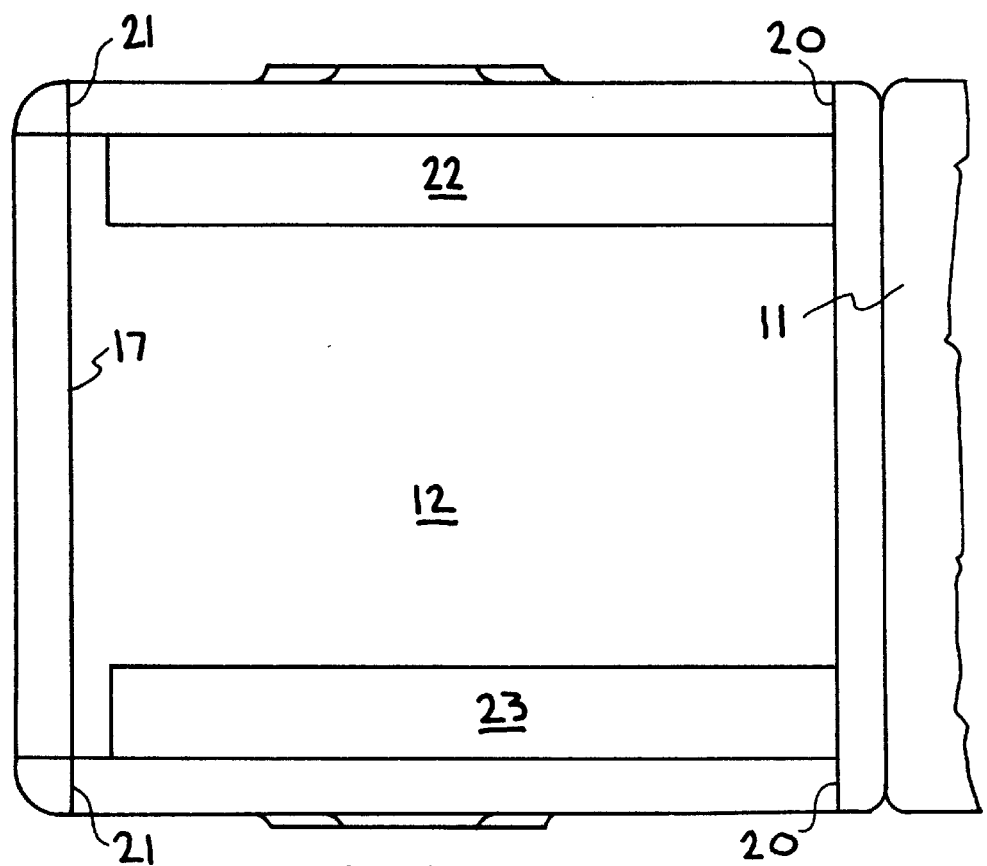

As seen in FIGS. 2, 3, and 4, the hidden storage area is provided by storage or structure boxes 22 and 23 mounted within the bed 12 and over the wheel wells 19, the boxes 22 and 23 being constructed to cover the wheel wells 19, but not extend to the top or upper surface 24 of bed 12, and terminate in spaced relation to tailgate 17. A latch mechanism 25 is mounted in the rear of each of boxes 22 and 23, as seen in FIG. 2, and is provided with a key lock 28. The latch mechanism 25 includes latch members 27 located in spaced relation along the bed 12, and which cooperate with corresponding latch members 28 in side panel 15, as shown in FIG. 3. While not shown, the latch members 27 are interconnected by a rod or cable which is connected to mechanism 25 which includes a release for members 27.

As seen in FIG. 3, the side panels 15 are each provided with braces 29 and a hinge 30 that extends the full length thereof. Shelves 31 and 32 are secured to the interior of storage or structure boxes 22 and 23, and the area forward of the wheel well 19 forms storage bins 33 accessible along the cut-lines 34 when the side panels 15 are raised. The hinges 30 are located on the interior of the bed 12 and thus not visible from the exterior, and may, for example, be radial swing type or pantograph lift type.

Figure 5:
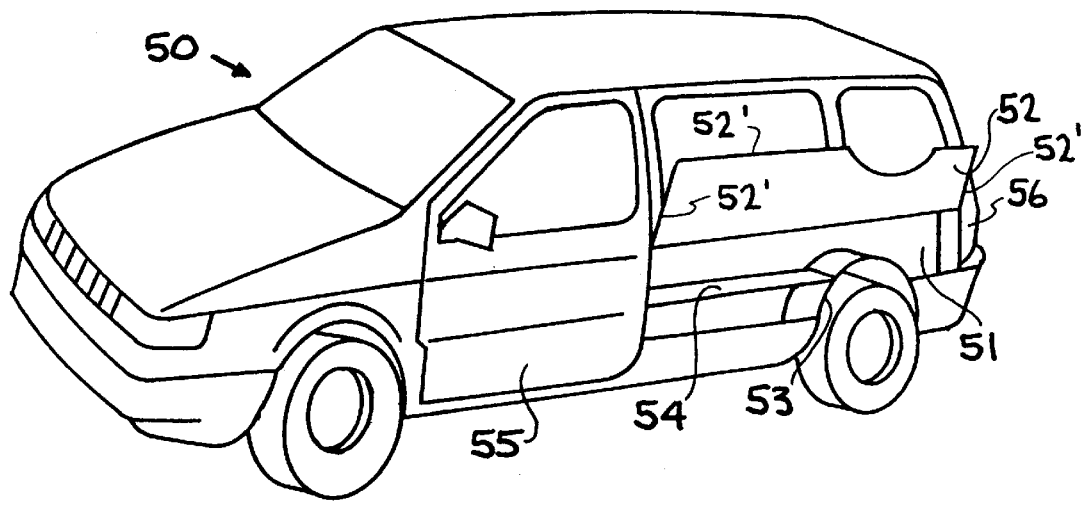
FIG. 5 is a perspective view of a hidden storage system in a van in accordance with the present invention.

FIG. 5 illustrates a van, such as a conventional three-door van, with a hidden storage system incorporated on the left or driver's side. While the van is illustrated as a passenger type, having windows along the side, and generally having a third door on the opposite or passenger side and a rear door, the hidden storage system can be incorporated into commercial type vans of various types, which may not include windows on the sides and may include only two doors plus a rear door. The interior of the van incorporating the hidden storage includes a storage box which extends along the interior side of the van adjacent the hinged side panel sections as in FIGS. 1–4 embodiment, the width and height of the storage box being varied in accordance with various needs.

As shown in FIG. 5, the van generally indicated at 50, such as a Dodge Caravan, is either initially assembled or modified (retrofitted) to include a storage box 51 and a hinged side panel section 52 including peripheral edges 52', with the storage box 51 and side panel section 52 being configured to extend over a rear wheel well 53 of van 50. The storage box 51 is provided with at least one shelf as shown at 54, which may be of an adjustable type and/or slideable type. A seal assembly is utilized to seal out moisture and/or dust when the side panel section is closed, and the side panel section includes support members as in FIGS. 1–4. In FIG. 5, the storage box 51 and hinged side panel section 52 extend from a point behind the driver's side door 55 to a point ahead of the rear 56 of van 50, and the side panel section 52 is hinged to raise upwardly. However, as described and illustrated hereafter with respect to FIGS. 9–12, the hinged side panel section(s) and/or storage box(es) may be located along only portions of the vehicle's side and/or may be split or hinged downwardly, sidewise, and/or upwardly. The hinges need not extend along the entire length of the hinged side panel section. Also, as illustrated with respect to the FIGS. 1–4 embodiment, and described hereinafter and illustrated in greater detail with respect to the FIGS. 13–14 embodiment, the hinged side panel section of FIG. 5 is provided with a lock/latch mechanism of either a mechanical or electrical type. Also, as seen in FIGS. 8A–8B and described hereinafter in greater detail with respect to FIGS. 15–16, the hinged side panel section of FIG. 5 is provided with a strut assembly to retain the side panel section in open position. In addition, the shelving arrangements of FIGS. 17 and/or 18 may be utilized in the FIG. 5 embodiment. While not shown, an appropriate seal may extend around the opening in the side panel, similar to a trunk seal.

Figure 6:
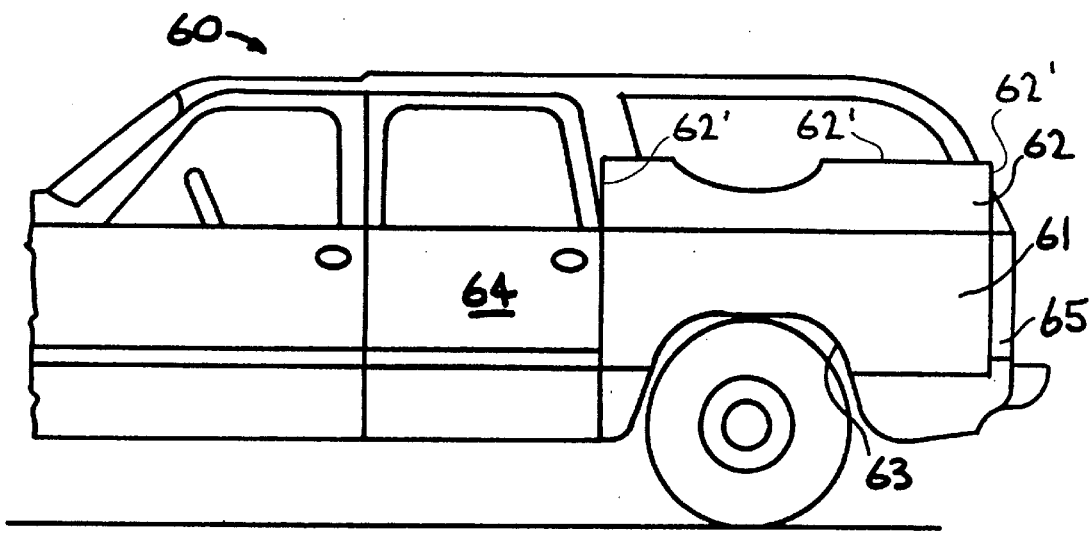
FIG. 6 is a side view of a four-door utility vehicle with a hidden storage system in accordance with the present invention.
Figure 17:
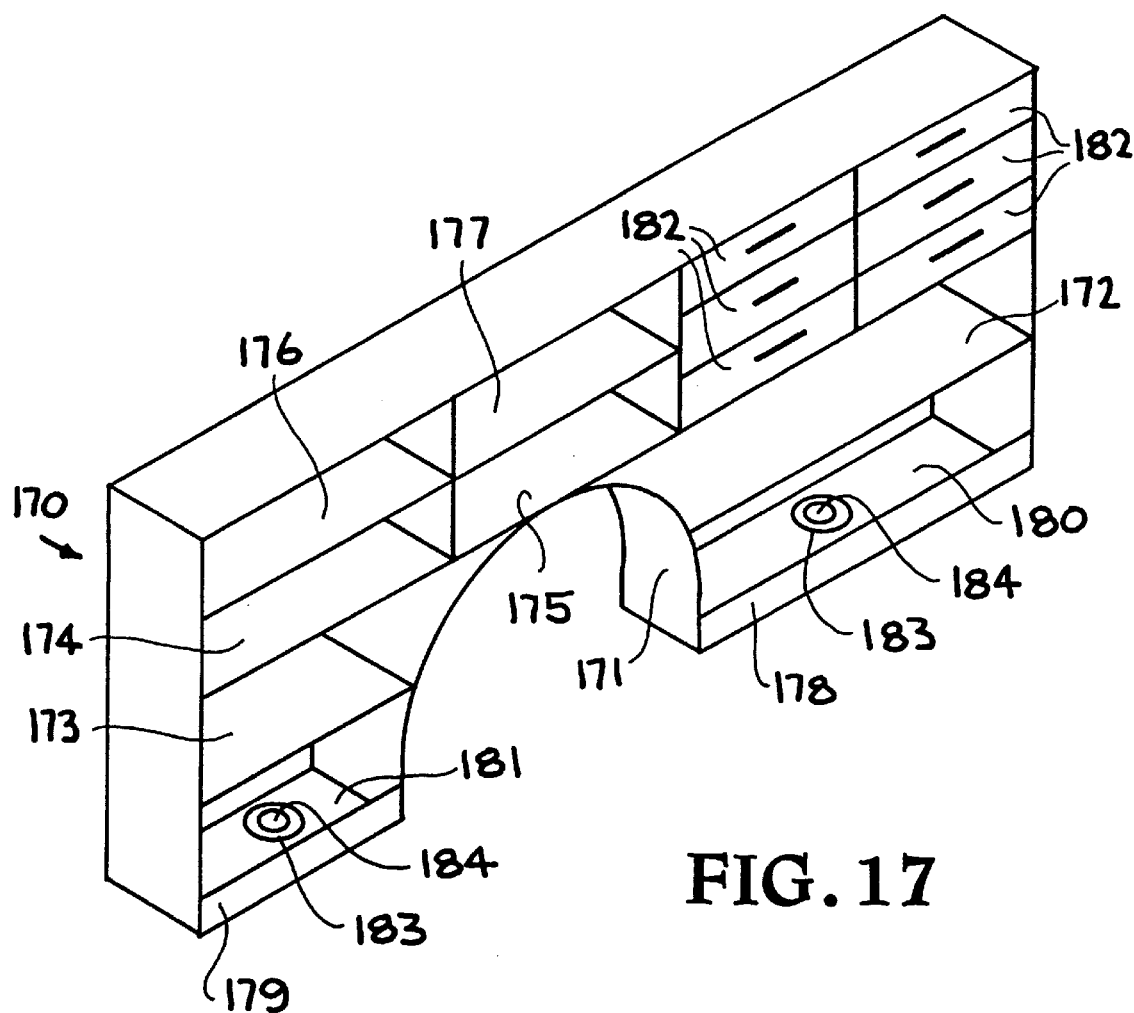
FIG. 17 schematically illustrates a shelving/storage arrangement for the storage box of the FIGS. 5–7 vehicles.
Figure 18:
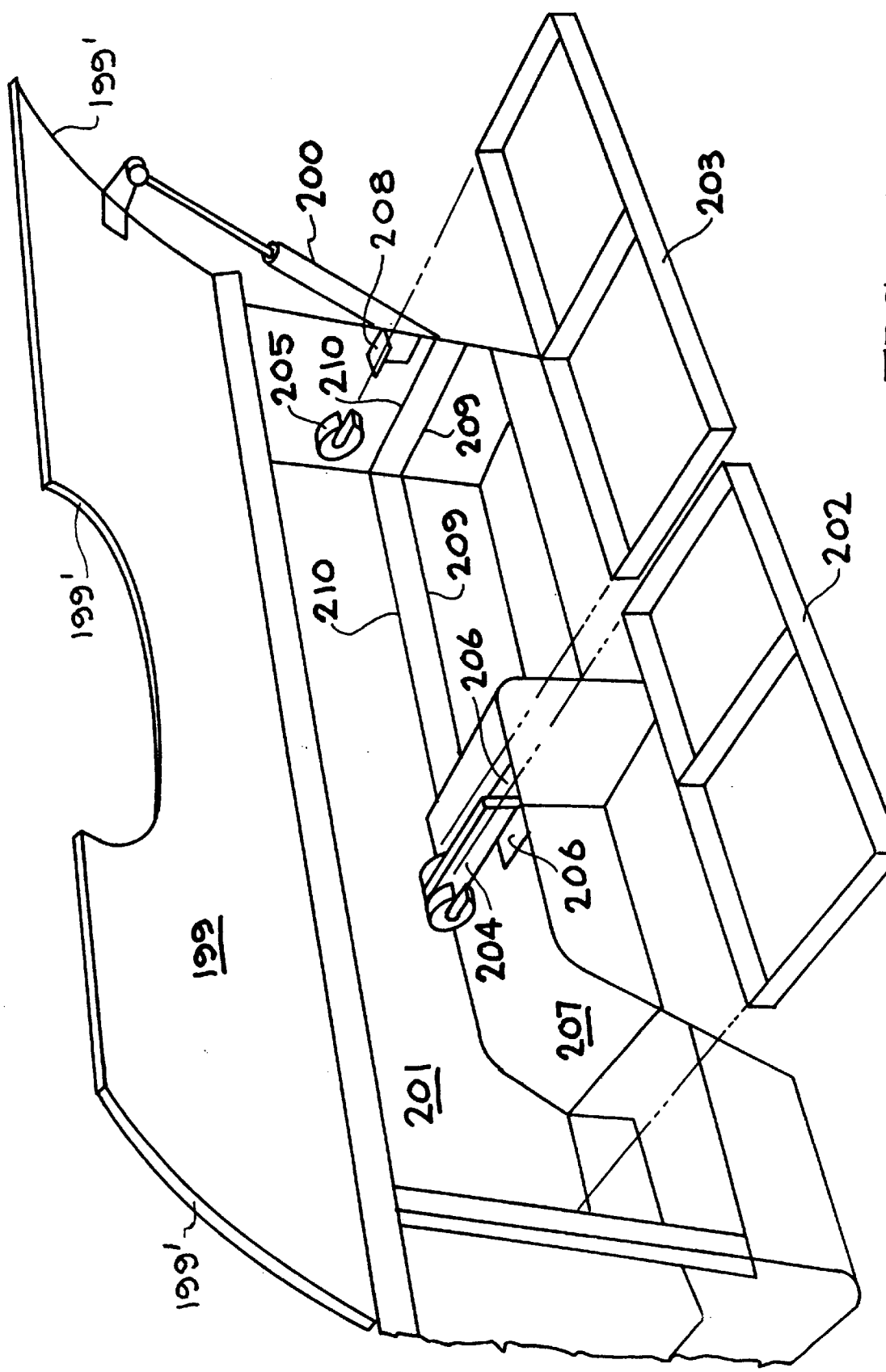
FIG. 18 illustrates an adjustable and/or slideable shelving arrangement for the storage box of the vehicle.

FIG. 6 illustrates a four-door utility vehicle, such as a Chevy Suburban, with a hidden storage system incorporated between the rear side door and the rear of the vehicle. The utility vehicle indicated at 60 includes a storage box 61 and a hinged side panel section 62 having peripheral edges 62', which are constructed to extend over a wheel well 63 intermediate rear side door 64 and the rear end 65 of the vehicle, as described above. While no shelving is shown in FIG. 6, one or more shelves of different types, such as shown in FIGS. 17 and 18, for example, may be installed in the interior of storage box 61. Also, as described above with respect to FIG. 5, lock/latch mechanisms and strut assemblies are incorporated to lock, release, and retain the hinged side panel section 62. An appropriate moisture and dust seal is utilized about the edge of the hinged side panel section when closed, and the inner surface of the side panel section may be coated with insulation and/or sound absorbing materials. Also, appropriate structural supports are fixed to the inner surface of the hinged side panel section.

Figure 7:
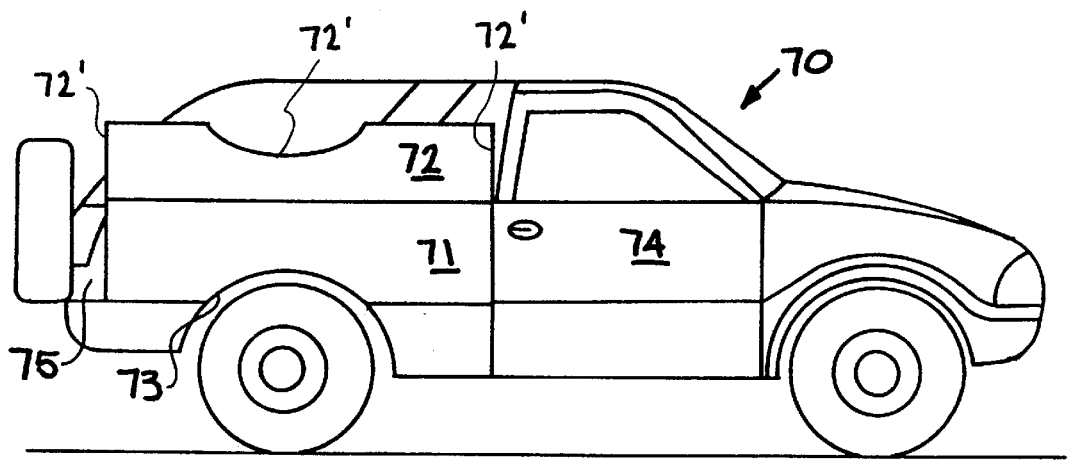
FIG. 7 is a side view of a two-door sports utility vehicle with a hidden storage system incorporated therein according to the present invention.

FIG. 7 illustrates the hidden storage system incorporated into a two door sports utility vehicle, such as a Ford Explorer, Chevy Blazer, etc. The vehicle indicated at 70 includes a storage box 71 and a hinged side panel section 72 having peripheral edges 72' which extend over a wheel well 73 and are located intermediate a passenger side door 74 and a rear end 75 of vehicle 70. As in the embodiments of FIGS. 5 and 6, the storage box and/or hinged side panel section includes shelves, insulation/sound materials, supports, a lock/latch mechanism, and strut assemblies. Also, as described above and in greater detail with respect to FIGS. 9–12 and 17–18, various configurations of the storage box and/or hinged side panel sections and shelving arrangements may be utilized.

Figure 8:
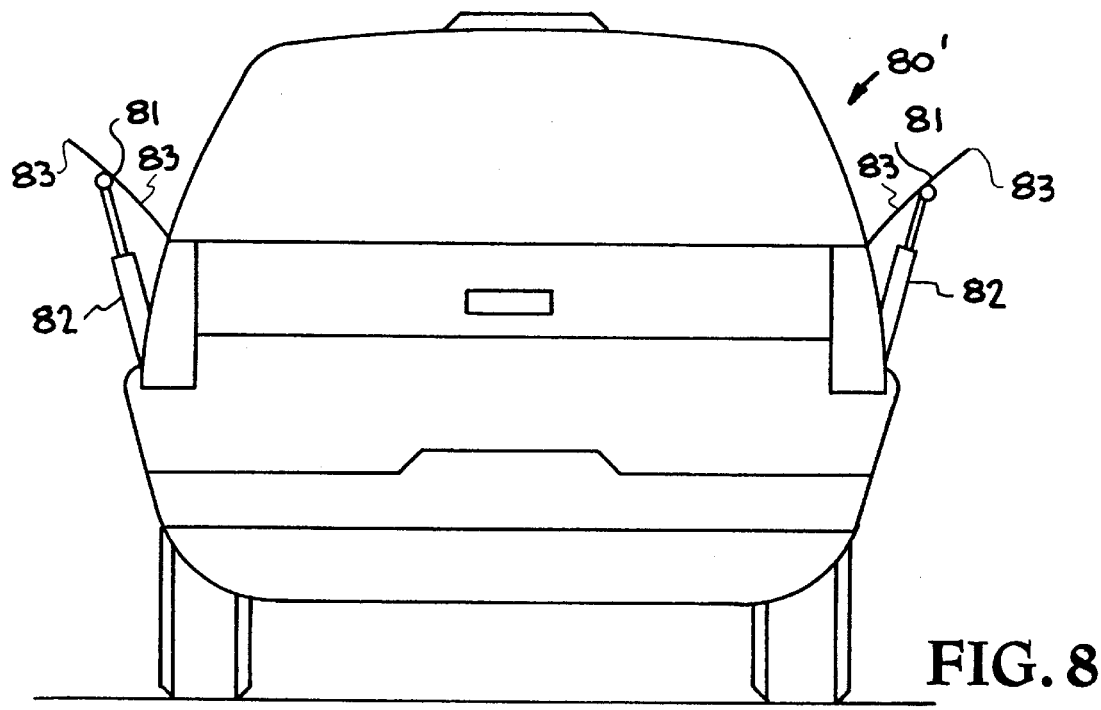
FIG. 8 is a rear view of a vehicle, such as shown in FIG. 6, with a hidden storage system on each side and with strut assemblies to hold the hinged side panel sections in a raised or open position.
Figure 20:
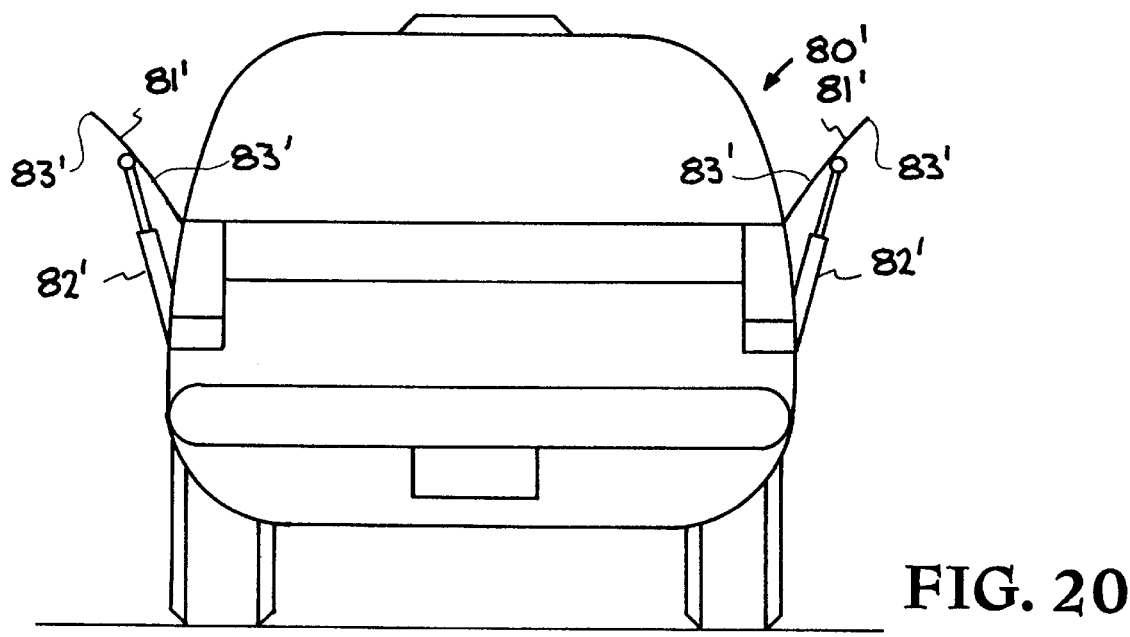
FIG. 20 is a rear view of a vehicle, such as shown in FIG. 7, with a hidden storage system similar to that of FIG. 8.

FIGS. 8 and 20 illustrate rear views of two different vehicles, such as the utility and sports utility vehicles described above with respect to FIG. 6 or 7, and illustrate hinged side panel sections on each side of the vehicle, since each of the vehicles of FIGS. 5–7 may be provided with a hidden storage system on each side thereof. As shown, the vehicles indicated at 80 and 80' include hinged side panel sections 81 and 81' adapted to close or open the interior of a storage box located on each side of the vehicle. The hinged side panel sections 81 and 81' are held in an open position by one or more strut assemblies 82 and 82' on each side of vehicle 80 and 80'. The strut assemblies 82 and 82' may be of the type described with respect to FIGS. 15 and 16, and may be insulated, heated, or insulated and heated, depending on the environmental conditions of the location of the vehicle. The hinged side panel sections 80 and 80' have peripheral edges 83 and 83', respectively.

The vehicle may include a plurality of hinged side panel sections which may open upwardly, downwardly, or sideways, and one or more of hinged side panel sections may be constructed on the interior thereof to form a work bench when opened. Various hinged panel section arrangements are schematically illustrated in FIGS. 9–12. While not illustrated, the hinged side panels have the same external contour as that of a similar vehicle without the hidden storage system. In other words, the hinged side panel sections or hinged fender/side panel sections have a contour corresponding to the remainder of the vehicle's side panels or fender/side panels. Thus, the only external differences of the FIGS. 9–12 embodiments are the vertical and/or horizontal cut lines which define the edges of the hinged side panel sections. While not shown, the side panel sections may be hinged to open sideways. The hinges, as pointed out above, are hidden from an external view of the side of the vehicle.

FIGS. 9–12 schematically illustrate modifications of the fender/side panels of the hidden storage system illustrated in FIGS. 5–8 and 20. It is to be understood that in actual practice the embodiments of FIGS. 9–12 would be configured as described above to match the external contour of the fender/side panels, and the storage boxes would be positioned within the vehicle as described above. Also, it is to be understood that a storage box could extend only along a section of the side panel which is hinged, and not the entire length of the side panel.

Figure 9:
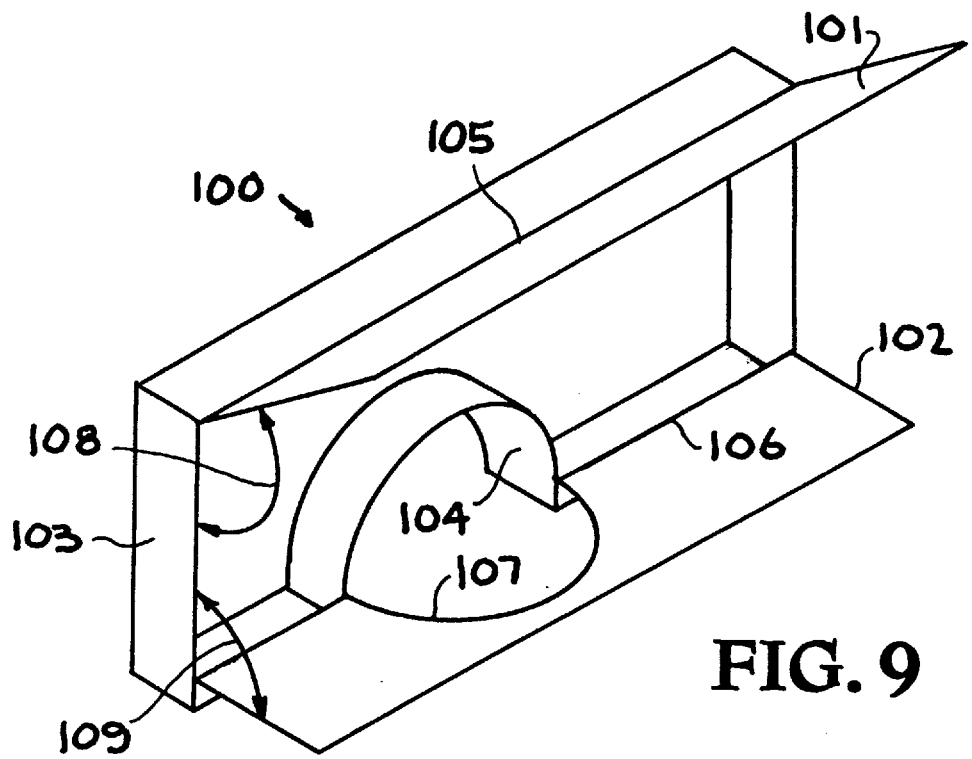
FIGS. 9–12 schematically illustrate various modifications of side panel and storage box arrangements of the hidden storage system of FIGS. 1–4 and 5–7.

FIG. 9 illustrates a split side panel arrangement generally indicated at 100 wherein a pair of longitudinal extending panel sections forming an upper panel section 101 and a lower panel section 102 are hinged to a storage box 103 formed over a wheel well 104 as indicated along horizontal lines 105 and 106, with the lower panel section 102 being configured as indicated at 107 to cooperate with the wheel well 104. As indicated by arrows 108 and 109, the upper panel section 101 and the lower panel section 102 are hinged whereby section 101 is raised and section 102 is lowered. While not shown, the upper panel sections would be provided with restraining struts, restraining type hinges, etc. This arrangement provides at least three advantages: 1) the lower panel section 102 may be utilized as a work shelf or bench, and 2) in case of strong winds, for example, the upper panel section is smaller and thus easier raised and lowered; and 3) only the upper or lower panel section may be utilized without having to raise the entire side panel. Also, the upper and lower panel sections would be provided with a latch and lock mechanism.

Figure 10:
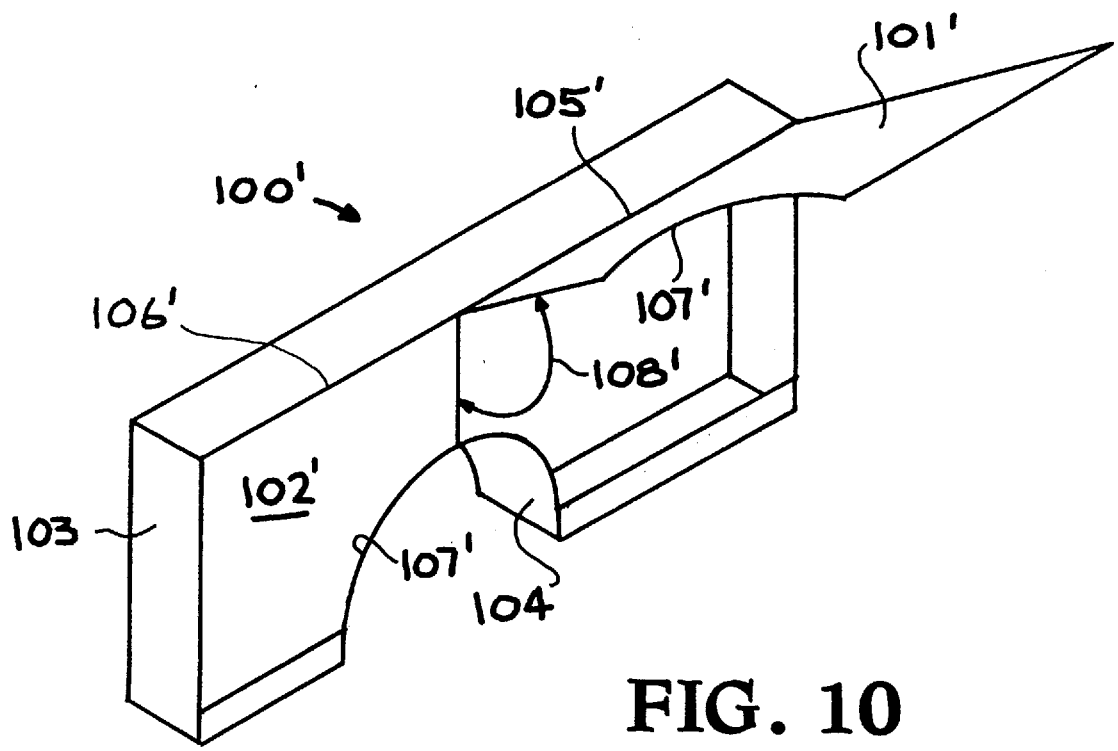

The FIG. 10 embodiment differs from the FIG. 9 embodiment in the configuration of the side panel sections, and corresponding reference numerals illustrate corresponding components. In this embodiment only one or both side panels can be hinged. In FIG. 10, the split side panel arrangement generally indicated at 100' includes a pair of split side panel sections 101' and 102' which are hinged along horizontal lines 105' and 106' at the upper end thereof. The panel sections are configured to conform with the contour of a conventional side panel vehicle. Side panel section 101' is shown in the raised or open position as indicated by arrow 108', while side panel section 102' is in the lowered or closed position. In this embodiment, only side panel section 101' may be hinged with the storage box 103' only extending the length of section 101'. In this embodiment, each of the side panel sections 101' and 102' includes a section 107' configured to cooperate with the wheel well 104' of storage box 103'. While the side panels 101' and 102' are hinged to swing or open upwardly, they could be hinged along the lower ends, as side panel section 102 of FIG. 9, whereby they could be lowered when opened, or hinged such that one section opens upwardly and one section opens downwardly. Also, only side panel section 101', for example, may be hinged. The advantages of the FIG. 10 embodiment is in the use of the storage area in front of the wheel well or in back of the wheel well, or both. Also, with only one section of the side panel open, there is less resistance to winds and can be easily opened and closed compared to the full side panel. While not shown, the side panel section 101', and if hinged the side panel section 102', would be provided with support or retention struts if opened upwardly or with retaining means, similar to that of a conventional pickup tailgate, if hinged to open downwardly. A latch and lock arrangement, while not shown, would be provided for the hinged panel section(s). Also, the side panel sections are configured to conform with the contour of the desired side panel bed.

Figure 11:
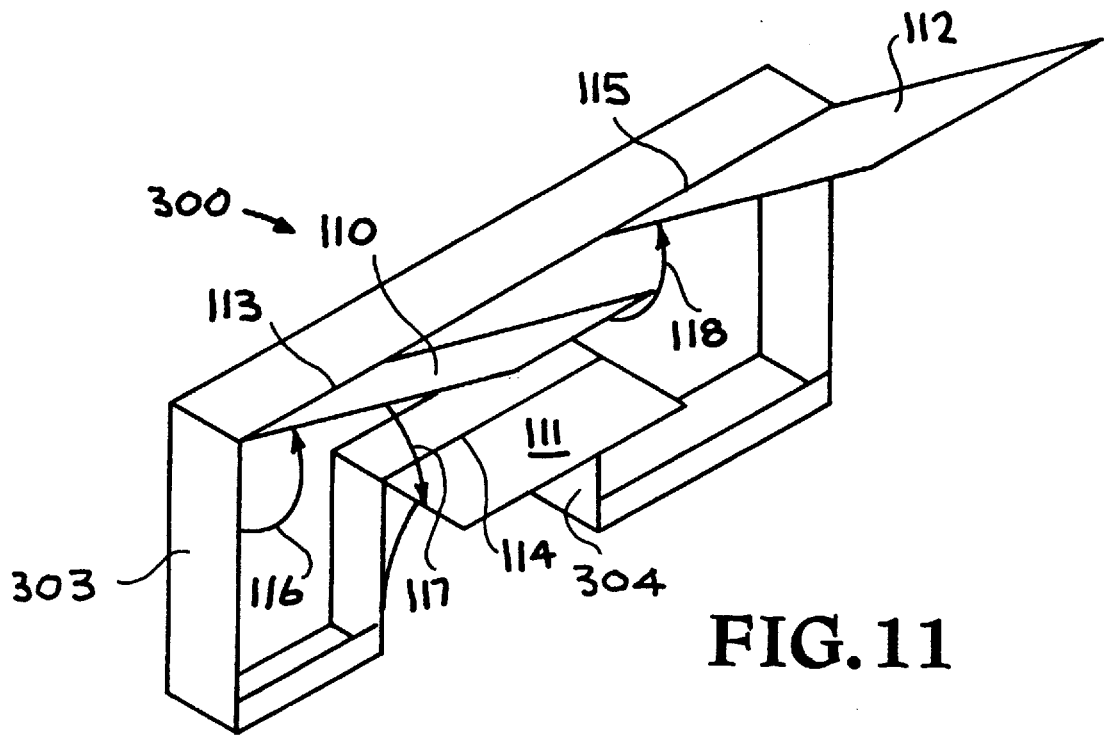

FIG. 11 illustrates another arrangement involving three movable side panel sections and components corresponding to those of FIG. 9, and are given corresponding reference numerals. As shown, the three-way split side panel arrangement generally indicated at 300 comprises a storage box 303 built over a wheel well 304, and provided with three (3) hinged side panel sections 110, 111, and 112 which are hinged along horizontal lines indicated at 113, 114, and 115 respectively. As indicated by arrows 116, 117, and 118, side panel sections 110 and 112 open upwardly while side panel section 111 opens downwardly. However, side panel section 111 may be hinged to open upwardly, and all three sections may be hinged on a common hinge. In addition, sections 110 and 111 may be hinged at a lower end so as to open downwardly. In this embodiment, the center side panel section 111 may be used as a work table, and any of the storage box sections above, in front of, or behind the wheel well may be utilized. If desired, only one or two of the three sections may be hinged and provided with a storage box therebehind, whereby storage would only be in one or two sections adjacent the wheel well.

Figure 12:
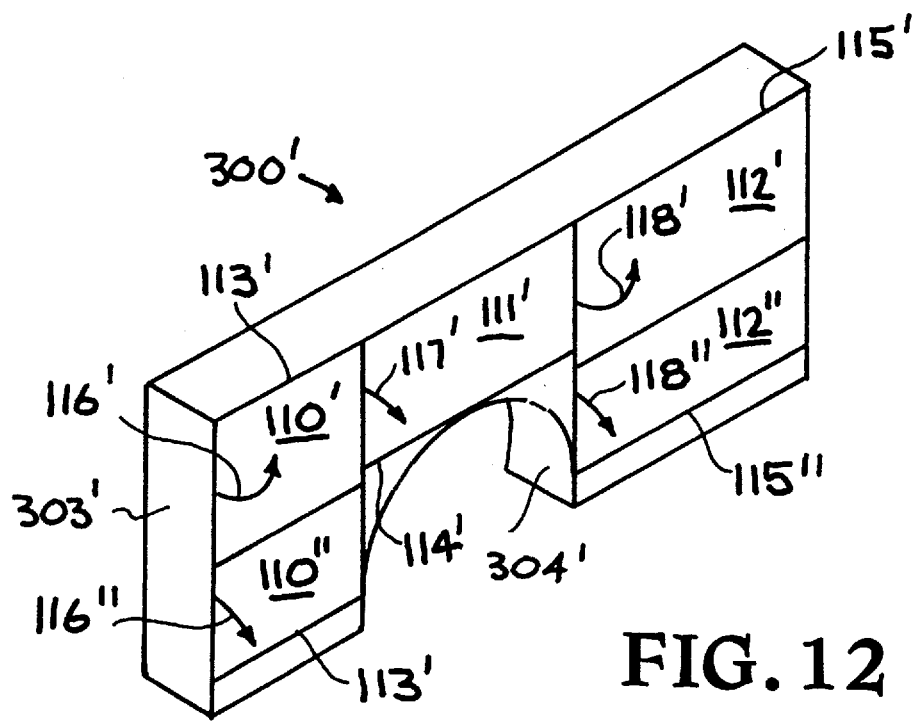

FIG. 12 illustrates a modification 300' of the FIG. 11 side panel arrangement and differs in utilizing five (5) side panel sections instead of three, with two of the sections being split. Corresponding reference numbers are given for corresponding components. The difference between FIG. 11 and FIG. 12 is that the two end sections of the side panel are split as indicated at 110'–110" and 112'–112", with panel sections 110' and 112' opening upward and panel sections 110" and 112" opening downward as indicated by arrows 116'–116" and 118'–118", with the panel sections 110'–110" and 112'–112" being hinged along lines 113'–113" and 115'–115". As in the FIG. 11 arrangement, the central side panel section 111' can be hinged to open upwardly instead of downwardly as indicated by arrow 117' hinged along line 114' as shown. In this embodiment any or all of panel sections 110", 111', and 112" can be utilized as a work table or bench. Also, by the arrangement of FIG. 12, there is access to various sections of the storage box 303' without the need to expose the entire interior of the storage box. As described above, the individual side panel sections are each provided with a latch/lock system and, if desired, the latch/lock system may be constructed to release individual or all of the side panel sections, either mechanically or electrically, as described below.

The side panel section arrangements of FIGS. 9–12 enable, if desired, the length and location of the storage box located behind the hinged sections to be varied. For example, with the FIG. 10 arrangement, the storage box need only extend half the length of the bed, providing side panel section 102' was not hinged. Also, with the panel section arrangement of FIG. 9, the storage box may need only extend along the body so as to be located above the level of the wheel well, provided the lower side panel section 102 is not hinged. As readily seen from the arrangements of FIGS. 11 and 12, certain side panel sections need not be hinged and the storage box therebehind may be constructed only to extend the length or depth of the desired hinged side panel sections. Regardless of the side panel section arrangement a user may desire, the hinged side panels must conform to the contour of the overall side panel configuration. It is recognized that the external appearance of the overall side panels of the body will show vertical or horizontal cuts defining the various side panel sections involved when sections of the side panels are hinged as illustrated in FIGS. 9–12. While it is preferable to hinge the side panel sections to open upwardly or downwardly, they can be hinged to open sideways.

Figure 13:
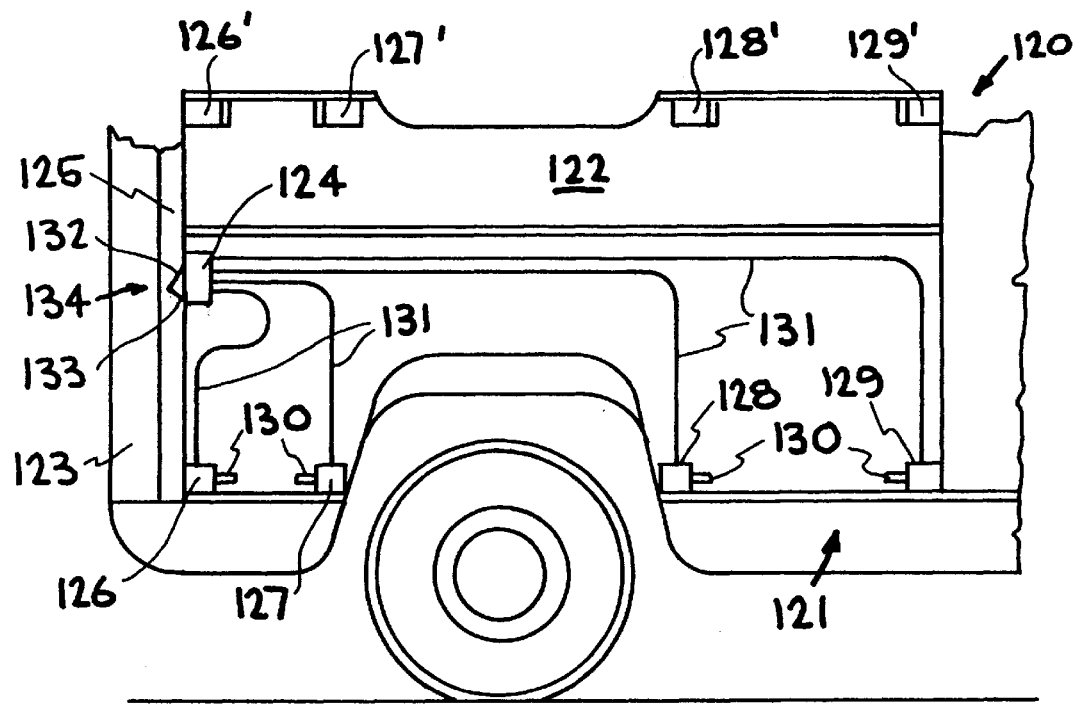
FIGS. 13 and 14 schematically illustrate mechanical and electrical latch/lock arrangements for the hinged side panels.
Figure 14:
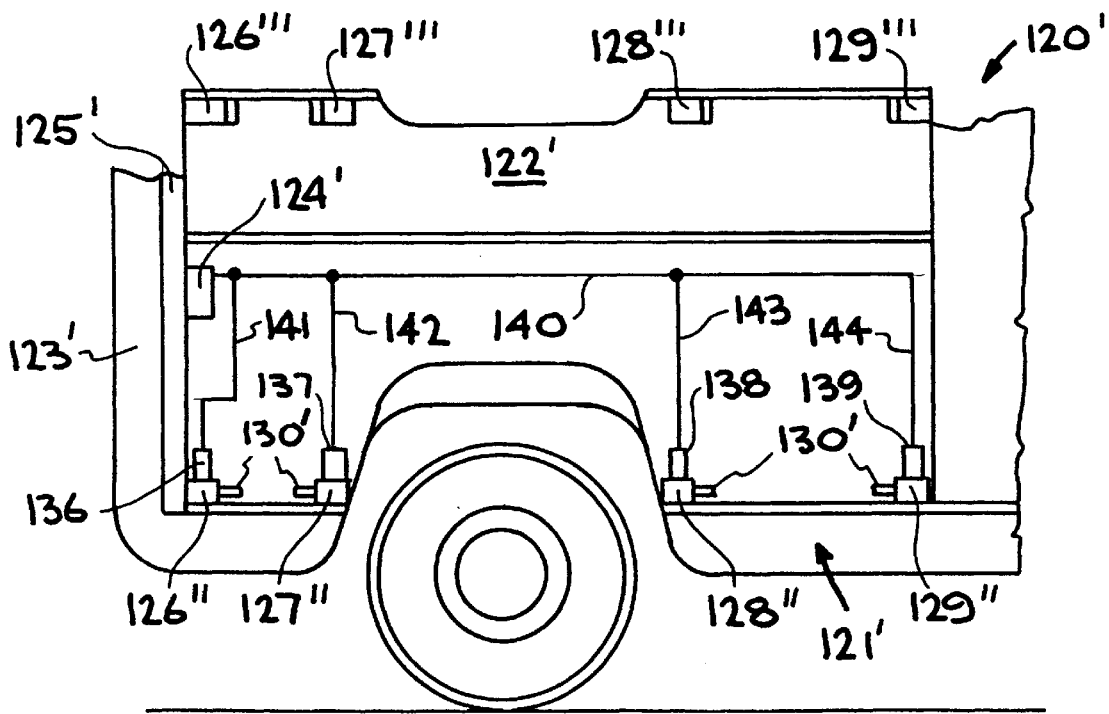

FIGS. 13 and 14 schematically illustrate embodiments of a mechanical type and an electrical type of latch/lock mechanism. Since the latch/lock mechanism is not visible from an external view of the vehicle, such is considered to be a hidden mechanism and is so defined herein. In the embodiment of FIG. 13, the latch mechanism is cable actuated. As shown, a vehicle indicated at 120 containing a hidden storage system generally indicated at 121 which includes a storage box as above described, and which includes at least one hinged side panel 122, and provided with an end gate or rear door 123, includes a lock release mechanism generally indicated at 124, having a keyed or keyless lock, not shown, and located at the rear of the storage system and spaced as indicated at 125 from the rear door 123. By this arrangement, the lock release mechanism 124 can be actuated from the inside of the vehicle without opening the end gate or door 123. The latch mechanism constructed of cooperating components are indicated at 126–126', 127–127', 128–128', and 129–129', with components 126, 127, 128, and 129 secured to the vehicle 120 or storage box within the enclosed area, while cooperating components 126', 127', 128', and 129' are secured to the inner and lower edge of the hinged side panel 122, such that when the side panel 122 is lowered the components of the latch mechanism interconnect. The components 126–129 each include a movable release member 130, which is actuated by a cable 131 connecting the lock release mechanism 124 via a lever 132 of the lock mechanism 124. Thus, upon movement outwardly of lever 132 as indicated by arrow 133, the cable 131 activates the movable release member 130, where latch components 126'–129' are released from components 126–129, and the hinged side panel 122 can be raised as illustrated. To resecure the side panel 122 when lowered, the lever 132 of lock release mechanism 124 is moved inwardly as indicated by arrow 134 whereby the activation cables 131 and release member 130 enable latch mechanism components 126–129 and 126'–129' to be reengaged for retaining the side panel 122 in a secured closed condition. Various types of mechanical lock/latch mechanisms are commercially available and thus a detailed description of a specific embodiment is deemed unnecessary. However, the lock/latch mechanism should be constructed to prevent the side panel 122 from being easily pried open. Some known lock/latch mechanisms require a 1500 pound pry to open same.

FIG. 14 illustrates an electrically activated lock/latch mechanism for hidden storage system 121' on vehicle 120', and is constructed similar to that of FIG. 13 except that electric solenoids and electric leads replace the activation cables of FIG. 13 and the lock release mechanism requires only a push button or key to actuate the latch mechanism via the solenoids. Also, the lock mechanism may be remotely controlled, such as by well-known vehicle security key/lock systems. As shown in FIG. 14, the lock release mechanism 124' is located at the rear of the storage box and spaced from the end gate or rear door 123' as indicated at 125'. Cooperating latch mechanisms 126"–126'", 127"–127'", 128"–128'", and 129"–129'" are mounted on vehicle 120' and side panel 122' as described above in FIG. 13. Each of latch mechanism components 126", 127", 128", and 129" are provided with a solenoid 136, 137, 138, and 139 which are connected to lock release mechanism 124' via electrical leads 140, 141, 142, 143, and 144. To release the latch mechanism to enable opening of the side panel 122' the lock release mechanism 124' is activated, such as by a push button, key, or combination, as known in the art, which activates solenoids 136–139 thereby moving movable members 130' to allow latch components 126'"–129'" to be released from latch components 126"–129", allowing side panel 122' to be opened. Since solenoid activated lock/latch mechanisms are well known in the automotive art, further description is deemed unnecessary.

While FIGS. 13 and 14 illustrate embodiments of the lock/latch mechanism with the lock release mechanism located at the rear of the storage box, the lock release mechanism can be located at the front of the storage box, or if an electrical lock/release system is used, as in FIG. 14, the lock release mechanism 124' can be located in the glove box, behind the driver's seat, or elsewhere in the vehicle. If desired, a key actuated lock release mechanism can be installed in a hinged side panel section but such would be visible from an external view of the vehicle and therefore would not be desirable in that the hidden aspect of the storage system would be reduced.

While the FIGS. 13–14 embodiments have illustrated the use of four (4) latch mechanisms, that number may be less for a single hinged side panel. Where the hinged side panel is composed of side panel sections, as in FIGS. 9–12, each hinged section should include one or more latch mechanisms, either mechanical or electrical. Also, where the side panel sections are hinged to open downwardly, the location of the cooperating latch mechanism components may be different and, for example, such may be secured to the sides of the hinged side panel sections and to a cooperating location on the storage box.

Figure 15:
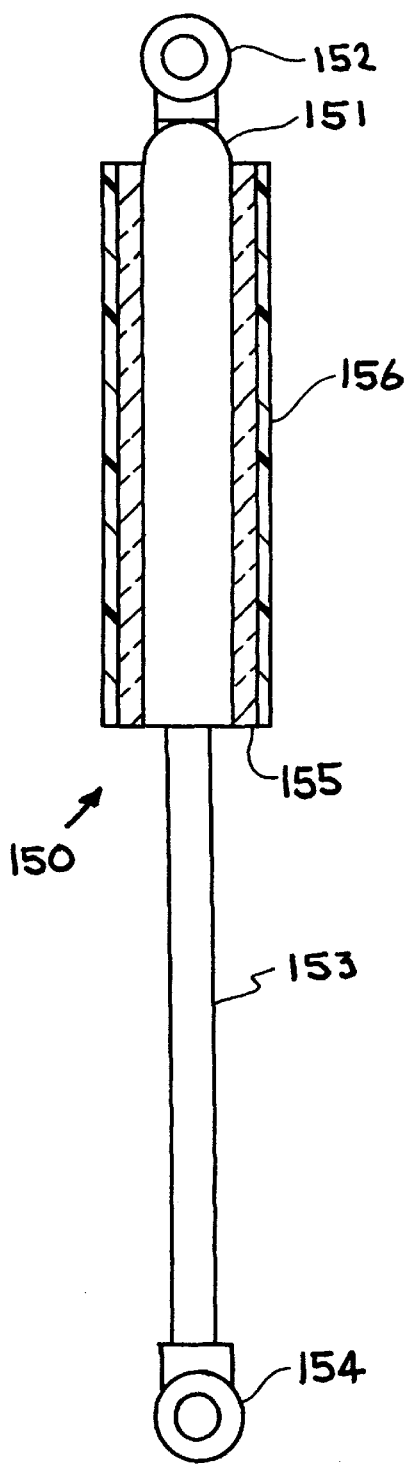
FIGS. 15 and 16 illustrate embodiments of struts for the hinged side panels with FIG. 15 having an insulated liner, while FIG. 16 includes a heater unit.
Figure 16:
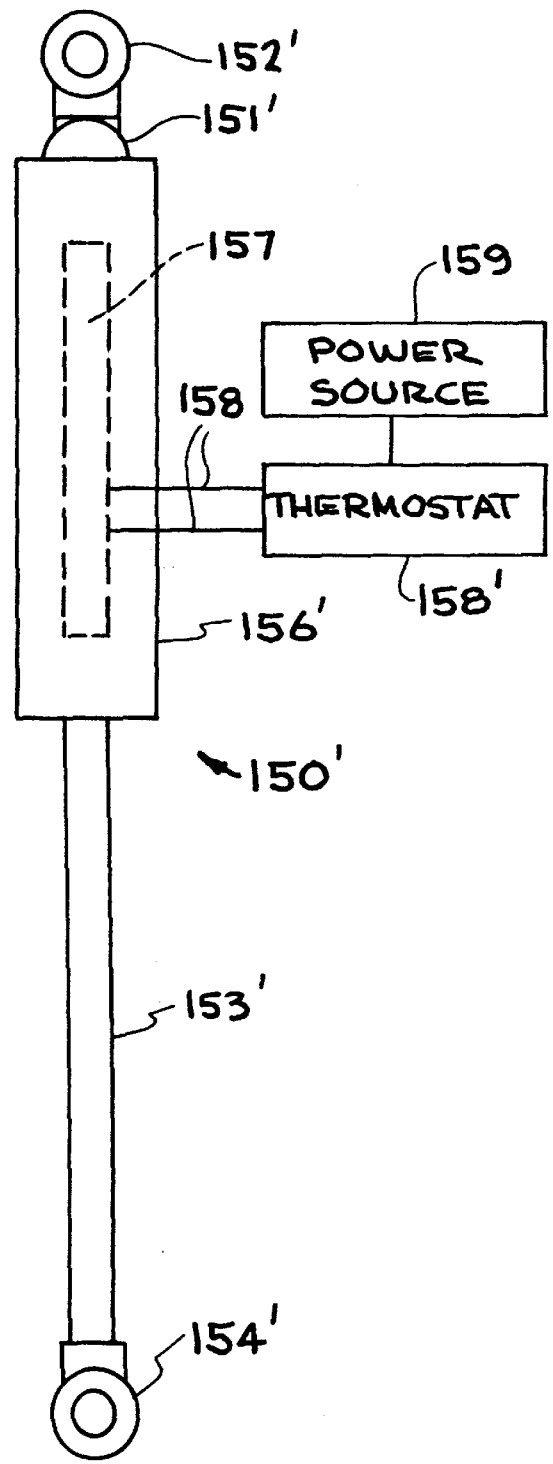

As pointed out above, the upwardly opening side panels are provided with means for retaining same in open position, such as by conventional torsion springs or strut assemblies, widely used in the automotive field for retaining open rear windows or doors. However, hinges which include spring or mechanically biased means, for example, are also commercially available which are constructed to retain a door or window open, and thus could be utilized in the hinged side panels. The use of strut assemblies is generally preferred, but struts have disadvantages when operating in extreme temperature conditions, either hot or cold. This problem is resolved by the strut assemblies illustrated in FIGS. 15 and 16, wherein insulation and/or heating therefor is provided. FIG. 15 illustrates a convention strut assembly with insulation about the body member, while FIG. 16 additionally illustrates an electrical heating strip for a conventional strut. However, the heating strip of FIG. 16 can be incorporated into the insulated strut assembly of FIG. 15. As shown in FIGS. 15 and 16, the strut indicated at 150, 150' comprises a body member 151, 151' having a connector member 152, 152' at one end, and a plunger member or rod 153, 153' having a connector member 154, 154' reciprocally mounted in body member 151, 151' and which is sealed in member 151, 151' as known in the art. The body member 151, 151'/rod 153, 153' may be provided with a conventional fluid or air arrangement which allows the rod 153, 153' to be moved in or retained in the body member 151, 151'. In FIG. 15, the body member 151 is provided with a layer 155 of insulation material and a protective layer or sleeve 156 about the insulation layer. However, depending on the composition of the insulation layer 155, the protective sleeve or layer 156 may not be needed. In FIG. 16, which is constructed as in FIG. 15, the body member 151' is additionally provided with one or more electrical heating strips 157 (only one shown), which would be electrically connected by electrical leads 158 via a thermostat 158' to the power supply 159 of the vehicle on which the strut is utilized. The electrical heating strip(s) 157 is positioned between the body member 151' and layer 156' or the insulation layer, whereby a heated/insulated strut is provided to withstand either extremely high or extremely low temperatures. However, the body member 151, 151' may be provided with one or more heating strips, if desired.

The hidden storage system is constructed such that a variety of storage shelves and/or storage compartments may be positioned in the storage boxes on either side of the bed. The storage boxes are provided with means by which shelves or compartments may be installed to fit a user's needs. The storage boxes may include areas of sufficient length and height for the storage of skis, ski poles, ski boots, and ski clothing, or for the storage of golf club bags and associated equipment or clothing, as well as for various tools, parts, etc. Also, the storage boxes may be designed to include areas for the storage of shopping purchases whereby such are secured from view—a truck with a trunk.

FIG. 17 schematically illustrates a shelf/storage compartment arrangement for tools, parts, etc. The shelves and storage compartments may be mounted so as to be movable (slideable) or adjustable. As shown in FIG. 17, a storage box such as illustrated at 51 in FIG. 5, here generally indicated at 170, and which includes a wheel well section 171, is provided with different size and/or length shelves 172, 173, 174, 175, 176, and 177. The storage box 170 is provided with upwardly extending lips or members 178 and 179 which form open boxes or compartments 180 and 181. However, the storage box 170 may be constructed to provide a flat surface at the bottom by elimination of the upwardly extending members 178 and 179. The storage box 170 of FIG. 17 additionally includes six compartments or drawers, indicated at 182, for small parts, etc. Compartments 180 and 181 are provided with openings 183 in which are positioned drain/air relief valve assemblies 184, described in detail hereinafter with respect to FIG. 19.

One of the side panels of FIGS. 5–7 is shown in detail in FIG. 18 wherein a side panel 199 having peripheral edges 199' is illustrated in an open position and retained by a gas lift or strut assembly 200 (only one shown) which may be constructed as shown in FIGS. 15 and 16. As seen in FIG. 18, the side panel assembly 195 additionally includes a storage box 201 into which are slideably mounted shelves or box shelves 202 and 203, which are supported by a common support member 204 and a pair of end support members 205 (only one shown). The inner ends of slideable shelves 202 and 203 slide on members 206 secured to the wheel well 207, while the outer ends of shelves 202 and 203 slide on member 208 (only one shown) secured to ends of the storage box 201. The storage box 201 is additionally provided with shelf supports 209 and 210 on which a shelf, not shown, can be mounted whereby the height thereof can be adjusted for various uses. If desired, support members similar to member 205 can be located at 209 or 210 to enable the uses of additional sliding shelves. Also, vertical adjustable shelf supports may be utilized.

Figure 19:
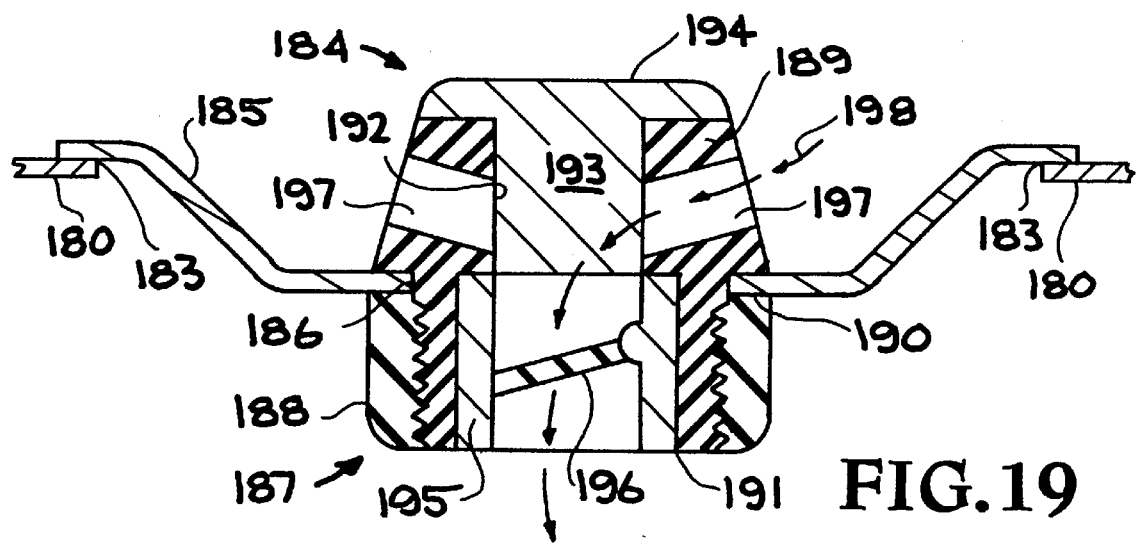
FIG. 19 illustrates an embodiment of a drain/air relief valve assembly for the storage box of the hidden storage system.

FIG. 19 illustrates an embodiment of a drain/air relief valve assembly indicated generally at 184 in FIG. 17 which is mounted in an opening 183 in compartments 180 and 181 of storage box 170. The valve assembly 184 is mounted in opening 183 of compartment 180, for example, by a tub or member 185 having an opening 186 and is secured in opening 183 at the outer periphery thereof, and may be constructed of metal, a composite, or plastic, for example. Valve assembly 184 includes a housing 187 or body members 188 and 189 secured together as by a threaded connection, not shown, with lower body member 188 having a groove 190 therein into which tub 185 extends, whereby the housing 187 is retained in opening 186 of tub 185. The housing 187 may be constructed of EPDM or rubber, for example. Body members 188 and 189 are provided with aligned openings 191 and 192, with a plug or member 193 having a pull grip 194 extending into opening 192. Opening 191 in lower body member 188 is provided a valve 195 having a flexible member 196 while upper body member 189 is provided with a plurality of radially extending openings 197. Flexible member 196 may be constructed of rubber, for example. Upon raising the plug 193 via the pull grip 194, water and/or air within compartment 180 of storage box 170 flows through radial openings 197 and moves downwardly (opens) flexible member 196 of valve 195, as illustrated by flow arrows 198. With the plug 193 in place, as shown in FIG. 19, air or moisture will not pass upwardly due to seating of flexible member 196 of valve 195.

While specific embodiments of the hidden storage system in accordance with the present invention have been described and/or illustrated, such are not intended to be limiting. For certain vehicles, such as the conventional three-door van, only one side of the vehicle would incorporate a hidden storage arrangement, while other vehicles may include a hidden storage on both sides. The length, depth, and height of the storage box or boxes and the associated hinged side panel section(s) may vary with the configuration of the vehicle (two door or four door), and if it has windows along the side. Also, depending on the intended use of the vehicle, two or more hinged side panel sections may be used with single or plural storage boxes. Thus, it has been shown that the present invention provides hidden storage for vehicles, particularly vans and utility/sports utility vehicles, with only very minor alteration of the external appearance of the vehicle, the only alteration being cut lines defining the edges of the hinged side panel sections.

The vehicle can be modified to incorporate the hidden storage, a conversion method, or the hidden storage can be incorporated via an assembly line manufacture of the vehicle or installed utilizing a modular assembly approach. Modifications and changes may become apparent to those skilled in the art, and it is intended that the invention be limited only by the scope of the appended claims.

What is claimed is:

1. A hidden storage system for a conventional vehicle having contoured fender/side panels each including at least one peripheral edge and which does not substantially alter an external contoured appearance of the vehicle, said storage system comprising:
   at least one storage box having an interior mounted on at least one side of said vehicle;
   at least one section of one of said contoured fender/side panels on at least said one side of said vehicle being hinged and including said one peripheral edge of said one fender/side panel, whereby said at least one section can be opened to expose the interior of said storage box and closed to cover the interior of said storage box;
   at least one latch mechanism mounted so as to be not exposed to an external view of the vehicle, and mounted to releasably secure said at least one hinged section of said one contoured fender/side panel; and
   lock means for actuating said at least one latch mechanism.

2. The hidden storage system of claim 1, wherein said vehicle includes wheel wells, and wherein said at least one storage box covers at least one of said wheel wells and extends forward and rearward therefrom.

3. The hidden storage system of claim 1, wherein said at least one storage box is constructed to extend along at least a section of a floor of said vehicle.

4. The hidden storage system of claim 1, wherein said latch mechanism includes a plurality of cooperating latch members adapted to be mounted on said storage box and said hinged section of said one fender/side panel.

5. The hidden storage system of claim 1, wherein said lock means is selected from the group consisting of mechanically activated means and electrically activated means.

6. The hidden storage system of claim 1, wherein said at least one storage box is provided with at least one shelf in the interior thereof.

7. The hidden storage system of claim 1, wherein each side of said vehicle is provided with at least one said storage box having the interior thereof, at least one said hinged fender/side panel section, and at least one said latch mechanism.

8. The hidden storage system of claim 7, wherein the latch mechanism on each side of said vehicle has a separate said lock means therefor.

9. The hidden storage system of claim 1, wherein said lock means is positioned at an end of said at least one storage box.

10. The hidden storage system of claim 1, additionally including at least one strut assembly operatively connected to retain said at least one hinged section of said one fender/side panel in a raised position.

11. The hidden storage system of claim 1, wherein said one fender/side panel additionally includes at least another section thereof which is hinged such that said fender/side panel sections can be moved outwardly to expose the interior of said storage box.

12. The hidden storage system of claim 11, wherein said one fender/side panel includes at least two sections hinged to enable raising each, lowering each, or raising one and lowering the other.

13. The hidden storage system of claim 11, wherein each section of said one fender/side panel is hinged by at least one hinge that extends along substantially an entire length of a hinged edge of said section thereof.

14. The hidden storage system of claim 1, additionally including at least one drain/air relief valve assembly mounted in a bottom section of said at least one storage box.

15. The hidden storage system of claim 14, wherein said at least one drain/air relief valve assembly is mounted in an opening in said bottom section of said at least one storage box by a member having an opening therein and secured in said opening of said storage box at an outer periphery thereof.

16. The hidden storage system of claim 15, wherein said drain/air relief valve assembly comprises: a housing having a central opening extending therethrough and a plurality of radially extending openings, said central opening being provided with a valve having a flexible member, and a plug having a pull grip, whereby raising the plug enables water and/or air within the storage box to flow through said radially extending openings and move said flexible member thereby opening said valve and allowing water and/or air to pass therethrough from said storage box.

17. The hidden storage system of claim 16, wherein said housing comprises two interconnected sections, said valve having the flexible member being located in one said interconnected section, and said plug having the pull grip being located in another said interconnect section.

18. A hidden storage system for a vehicle having side panels and which does not substantially alter an external appearance of the vehicle, said hidden storage system comprising:
   at least one storage box having an interior mounted on at least one side of said vehicle;
   at least one section of one said side panels on at least said one side of said vehicle being hinged, whereby said at least one section can be opened to expose the interior of said storage box and closed to cover the interior of said storage box;
   at least one hidden latch mechanism mounted to releasably secure said at least one hinged section of said one side panel;
   lock means for actuating said at least one latch mechanism; and
   at least one strut assembly operatively connected to retain said at least one hinged section of said one side panel in an open position;

said at least one strut assembly being provided with means selected from the group consisting of insulating means, heating means, and heating and insulating means.

19. In a vehicle having contoured side panels, each including at least one peripheral edge, a hidden storage system comprising:

at least one hinged contoured side panel section including said one peripheral edge of one said contoured side panels, at least one storage box having an interior located adjacent said at least one hinged contoured side panel section, and a lock/latch mechanism for said at least one hinged contoured side panel section, said hidden storage system being constructed to not substantially alter an external appearance of the contoured side panels of the vehicle.

20. The hidden storage system of claim 19, wherein said hinged contoured side panel section is hinged to open upwardly or downwardly.

21. The hidden storage system of claim 19, additionally including a strut assembly for retaining said hinged contoured side panel section in an open position.

22. The hidden storage system of claim 19, additionally including at least one shelf in the interior of said storage box.

23. The hidden storage system of claim 19, wherein said storage box and said hinged contoured side panel section extend along a length of said vehicle intermediate a door and a rear end of said vehicle.

24. The hidden storage system of claim 23, wherein said vehicle includes a body and wherein said door is located on at least a driver's side of said body.

25. The hidden storage system of claim 24, wherein said vehicle is selected from the group consisting of vans, minivans, and sports utility vehicles.

26. The hidden storage system of claim 25, wherein said vehicle comprises a van having a single side door on each side.

27. The hidden storage system of claim 25, wherein said vehicle comprises a van or minivan having three side doors, said hidden storage system being located on a side having only one said side door.

28. The hidden storage system of claim 25, wherein said vehicle comprises a two-door sports utility vehicle.

29. The hidden storage system of claim 25, additionally including at least one drain/air relief valve assembly comprising:

a housing having two interconnected sections and a central opening therethrough, one of said two housing sections containing in said central opening a valve with a flexible member, another of said two housing sections being provided with radially extending openings and containing in said central opening a plug member having a pull grip thereon, whereby upward movement of said plug member enables passage of fluid and/or air from said storage box through said radially extending openings and causes movement of said flexible member of said valve allowing fluid and/or air to pass through said valve.

30. The hidden storage system of claim 23, wherein said vehicle includes a cab section and a bed section, wherein said door is located in said cab section, and wherein said hinged contoured side panel section and said rear end are located in said bed section.

31. The hidden storage system of claim 23, wherein one said storage system is mounted on each of opposite sides of said vehicle.

32. The hidden storage system of claim 23, wherein the storage system extends substantially an entire length from said door to said rear end of said vehicle.

33. The hidden storage system of claim 23, wherein said at least one contoured hinged side panel section is configured to include at least two hinged sections.

34. The hidden storage system of claim 33, wherein said at least two hinged sections are constructed to be hinged along an edge, whereby outward movement of the two hinged sections exposes the interior of said at least one storage box, and inward movement of the two hinged sections covers the interior of said at least one storage box.

35. The hidden storage system of claim 23, wherein said at least one contoured hinged side panel section is configured to include three hinged sections, whereby outward movement of any of the three hinged sections exposes a portion of the interior of said at least one storage box.

36. The hidden storage system of claim 19, wherein one said hidden storage system is located on each side of said vehicle.

37. The hidden storage system of claim 19, additionally including at least one drain/air relief valve assembly mounted in a bottom section of said at least one storage box.

38. The hidden storage system of claim 19, wherein said hinged contoured side panel section is substantially continuously hinged.

39. The hidden storage system of claim 19, wherein said lock/latch mechanism is hidden to an external view of the vehicle.

40. The hidden storage system of claim 19, additionally including at least one strut assembly operatively connected to retain said at least one hinged contoured side panel section in an open position, said at least one strut assembly being provided with means selected from the group consisting of insulating means, heating means, and heating and insulating means.

41. A vehicle having hidden storage therein;

said vehicle having an external appearance, and at least a driver's side door, a passenger side door, a pair of side panels, each including at least one peripheral edge, and a rear end section, said hidden storage being located in said vehicle intermediate at least one of said side doors and said rear end section, said hidden storage comprising:

a storage box having an interior with an open side located adjacent a section of one of said side panels of said vehicle, said side panel section including said at least one peripheral edge of said one side panel, and being hinged to enable exposure of the interior of said storage box, and a hidden lock/latch mechanism for said hinged side panel section, said hidden storage being constructed and mounted in said vehicle to not substantially alter the external appearance of the vehicle.

42. The vehicle of claim 41, having one said hidden storage located intermediate both side doors respectively and said rear end section.

43. The vehicle of claim 41, wherein said hidden storage extends from adjacent said one side door to adjacent said rear end section.

44. The vehicle of claim 41, wherein said hinged side panel section is composed of at least two sections, each of said two sections including an edge closely facing an edge of another of said two sections, each of said two sections being hinged along an edge opposite said facing edge, whereby outward movement of either of said facing edges of said two sections exposes a portion of the interior of said storage box.

45. The vehicle of claim 41, wherein each of said side panels include an inner panel section and an outer panel section, and wherein said hinged side panel section includes only one said outer panel section.

46. The vehicle of claim 41, additionally having a body section including said side doors, said rear end section, and said hidden storage, said vehicle being selected from the group consisting of vans, minivans, and sports utility vehicles.

47. The vehicle of claim 41, selected from the group of trucks and pickups, and wherein said hidden storage is located in a bed section thereof.

48. The vehicle of claim 41, wherein said hinged side panel section is composed of three hinged sections, each of the three hinged sections being hinged such that outward movement thereof exposes a portion of the interior of said storage box.

* * * * *